US012419306B2

(12) United States Patent
Nakamura et al.

(10) Patent No.: US 12,419,306 B2
(45) Date of Patent: Sep. 23, 2025

(54) MESOSTIGMATA MITE CONTROL COMPOSITION

(71) Applicant: MEIJI SEIKA PHARMA CO., LTD., Tokyo (JP)

(72) Inventors: Satoshi Nakamura, Tokyo (JP); Takehiko Inoue, Tokyo (JP)

(73) Assignee: MEIJI SEIKA PHARMA CO., LTD., Tokyo (JP)

( * ) Notice: Subject to any disclaimer, the term of this patent is extended or adjusted under 35 U.S.C. 154(b) by 855 days.

(21) Appl. No.: 17/275,461

(22) PCT Filed: Sep. 13, 2019

(86) PCT No.: PCT/JP2019/036053
§ 371 (c)(1),
(2) Date: Mar. 11, 2021

(87) PCT Pub. No.: WO2020/054835
PCT Pub. Date: Mar. 19, 2020

(65) Prior Publication Data
US 2022/0046921 A1    Feb. 17, 2022

(30) Foreign Application Priority Data
Sep. 14, 2018    (JP) .................. 2018-172426

(51) Int. Cl.
*A01N 43/42* (2006.01)
*A01N 25/04* (2006.01)
*A01N 25/06* (2006.01)
*A01N 25/14* (2006.01)
*A01N 43/16* (2006.01)
*A01N 43/40* (2006.01)
*A01N 47/22* (2006.01)
*A01N 53/00* (2006.01)
*A01N 57/12* (2006.01)
*A01N 57/14* (2006.01)
*A01P 7/02* (2006.01)

(52) U.S. Cl.
CPC .............. *A01N 43/42* (2013.01); *A01N 25/04* (2013.01); *A01N 25/06* (2013.01); *A01N 25/14* (2013.01); *A01N 43/16* (2013.01); *A01N 43/40* (2013.01); *A01N 47/22* (2013.01); *A01N 53/00* (2013.01); *A01N 57/12* (2013.01); *A01N 57/14* (2013.01); *A01P 7/02* (2021.08)

(58) Field of Classification Search
CPC .................. A01P 7/02; A01N 43/42
See application file for complete search history.

(56) References Cited

U.S. PATENT DOCUMENTS

| | | | |
|---|---|---|---|
| 5,190,952 A | 3/1993 | Minowa et al. | |
| 6,787,557 B2 * | 9/2004 | Yamamoto | A01N 43/42 514/312 |
| 7,022,855 B2 * | 4/2006 | Yamamoto | A61P 33/00 546/159 |
| 2004/0077602 A1 | 4/2004 | Oyama | |
| 2014/0315839 A1 | 10/2014 | Horikoshi et al. | |
| 2016/0165888 A1 | 6/2016 | Horikoshi et al. | |
| 2019/0200610 A1 | 7/2019 | Horikoshi et al. | |
| 2020/0315172 A1 | 10/2020 | Horikoshi et al. | |

FOREIGN PATENT DOCUMENTS

| | | |
|---|---|---|
| CN | 107711849 A | 2/2018 |
| EP | 1 291 344 A1 | 3/2003 |
| EP | 1 386 914 A1 | 2/2004 |
| EP | 3 597 041 A1 | 1/2020 |
| JP | 2003-055115 A | 2/2003 |
| JP | 2012-87090 A | 5/2012 |
| JP | 5745704 B2 | 4/2015 |
| JP | 2018024669 A * | 2/2018 |
| WO | 02/083644 A1 | 10/2002 |
| WO | 03075662 A1 | 9/2003 |
| WO | 2004/032629 A1 | 4/2004 |
| WO | 2006/106811 A1 | 10/2006 |
| WO | 2012/121121 A1 | 9/2012 |
| WO | 2014/119752 A1 | 8/2014 |
| WO | 2018/169045 A1 | 9/2018 |
| WO | 2020/054835 A1 | 3/2020 |

OTHER PUBLICATIONS

Communication, dated Mar. 25, 2021, issued by The International Bureau of WIPO in counterpart application PCT/JP2019/036053.
Communication, dated Jul. 15, 2021, issued by the China National Intellectual Property Administration in application No. 201980059564.3.
Extended European Search Report, dated Sep. 27, 2021, issued by the European Patent Office in European Patent Application No. 19860572.7.
International Search Report for PCT/JP2019/036053, dated Dec. 17, 2019 [PCT/ISA/210].
Written Opinion for PCT/JP2019/036053, dated Dec. 17, 2019 [PCT/ISA/237].

* cited by examiner

Primary Examiner — Gina C Justice
(74) Attorney, Agent, or Firm — Sughrue Mion, PLLC

(57) ABSTRACT

A Mesostigmata mite control composition comprising, as active ingredients: a specific quinoline derivative compound such as 8-fluoro-2,3-dimethyl-6-(1,1-dimethylethyl)-4-(methylcarbonyl)oxyquinoline; and at least one of other pest control agents exhibits an excellent control effect on Mesostigmata mites.

4 Claims, No Drawings

MESOSTIGMATA MITE CONTROL COMPOSITION

CROSS REFERENCE TO RELATED APPLICATIONS

This application is a National Stage of International Application No. PCT/JP2019/036053, filed Sep. 13, 2019, claiming priority based on Japanese Patent Application No. 2018-172426, filed Sep. 14, 2018.

TECHNICAL FIELD

The present invention relates to a Mesostigmata mite control composition, and more particularly a Mesostigmata mite control composition and a combination product for Mesostigmata mite control as well as Mesostigmata mite control methods using these.

BACKGROUND ART

Mesostigmata mites include red mite (*Dermanyssus gallinae*), northern fowl mite (*Ornithonyssus sylviarum*), tropical rat mite (*Ornithonyssus bacoti*), Varroa mite (*Varroa destructor*), canine nasal mite (*Pneumonyssoides caninum*), and the like. These Mesostigmata mites are known to cause important problems with veterinary hygiene, because they parasitize or suck blood from insects and homeotherms such as birds and mammals. Hence, many control agents have conventionally been developed against such mites which parasitize or suck blood from insects or homeotherms. However, since such mites have been confirmed to have certain drug resistance, and for the other reasons, compositions with sufficient control effect have not been achieved, and there has still been a demand for the development of a Mesostigmata mite control composition having an excellent acaricidal activity.

As such a control composition, for example, the present applicant filed an application (Japanese Patent Application No. 2017-052200) on Mar. 17, 2017, for a Mesostigmata mite control agent comprising, as an active ingredient, a compound represented by a general formula (1) according to the present invention as described below.

In addition, PTL 1 (Japanese Unexamined Patent Application Publication No. 2003-055115) describes a rice insect pest control composition comprising: a compound represented by a general formula (1) or an acid addition salt thereof; and at least one rice insect pest control compounds, and PTL 2 (International Publication No. WO2012/121121) describes an insect pest control composition comprising: a quinoline compound represented by a formula (I); a hydrazide compound; and one or more insect pest control compounds selected from dinotefuran and the like. However, these PTLs do not disclose that these compositions are effective against Mesostigmata mites including red mite, northern fowl mite, and the like.

In addition, as a composition formed by combining compounds having pest control effects as described above, for example, PTL 4 (Japanese Patent No. 5745704) describes an insect pest control composition comprising: at least one of N-[1-((6-chloropyridine-3-yl)methyl)pyridine-2 (1H)-ylidene]-2,2,2-trifluoroacetamide and an acid addition salt thereof; and at least one of other pest control agents such as imidacloprid.

CITATION LIST

Patent Literature

[PTL 1] Japanese Unexamined Patent Application Publication No. 2003-055115
[PTL 2] International Publication No. 2012/121121
[PTL 3] Japanese Patent No. 5745704

SUMMARY OF INVENTION

Technical Problem

The present invention has been made in view of the above-described problem, and an object of the present invention is to provide a Mesostigmata mite control composition and a combination product for Mesostigmata mite control as well as Mesostigmata mite control methods using these, having an excellent control effect on Mesostigmata mites.

Solution to Problem

The present inventors have conducted intensive study to achieve the above-described object, and consequently have found that when a specific quinoline derivative compound and another pest control agent are used in combination, these components do not exhibit impaired activities but rather exhibit a synergistic effect, showing a significantly excellent control effect on Mesostigmata mites. This finding has led to the completion of the present invention.

Aspects of the present invention obtained by the above-described finding are as follows:

[1]

A Mesostigmata mite control composition comprising, as active ingredients:

at least one selected from the group consisting of compounds represented by the following general formula (1) and acid addition salts thereof; and at least one selected from the group consisting of other pest control agents:

[Chem. 1]

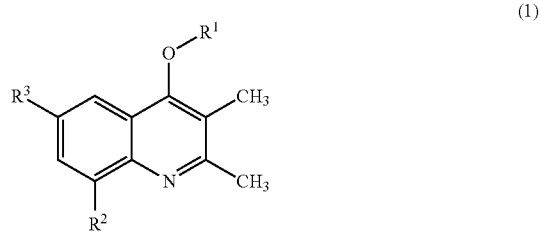

(1)

[in the general formula (1), $R^1$ represents a hydrogen atom, —$COR^4$, —$COOR^4$ (where $R^4$ represents an alkyl group having 1 to 4 carbon atoms), —$CH_2OCH_3$, or —$COCH_2OCH_3$, and $R^2$ and $R^3$ may be the same or different, and each represent a hydrogen atom, a halogen atom, an alkyl group having 1 to 4 carbon atoms, or an alkoxy group having 1 to 4 carbon atoms].

[2]
The Mesostigmata mite control composition according to [1], wherein
the compounds represented by the general formula (1) are compounds where $R^1$ in the formula is an acetyl group or a methoxycarbonyl group.

[3]
The Mesostigmata mite control composition according to [1] or [2], wherein
the Mesostigmata mite is at least one selected from the group consisting of mites of the family Dermanyssidae and mites of the family Macronyssidae.

[4]
The Mesostigmata mite control composition according to any one of [1] to [3], wherein
the other pest control agents are at least one selected from the group consisting of pesticides, anthelmintics, acaricides, rodenticides, and microbicides.

[5]
The Mesostigmata mite control composition according to any one of [1] to [3], wherein
the other pest control agents are at least one selected from the group consisting of compounds represented by the following general formula (10), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos, dicrotophos, dimethoate, dimethylvinphos, ethyl-p-nitrophenyl phenylthiophosphonothiate (EPN), ethion, ethoprophos, famphur, fenamiphos, fenitrothion, fenthion, fosthiazate, heptenophos, imicyafos, isofenphos, isopropyl-O-(methoxyaminothio-phosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimifos, temephos, terbufos, tetrachlorvinphos, thiometon, triazophos, trichlorfon, vamidothion, alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, fenothiocarb, bensultap, cartap, thiocyclam, thiosultap-sodium, dicofol, tetradifon, chlordane, endosulfan, fipronil, ethiprole, avermectin, ivermectin, milbemycin, selamectin, moxidectin, eprinomectin, abamectin, emamectin benzoate, lepimectin, mylbemectin, imidacloprid, clothianidin, thiamethoxam, acetamiprid, nitenpyram, thiacloprid, dinotefuran, acrinathrin, allethrin, bifenthrin, bioallethrin, cycloprothrin, cyfluthrin, cyhalothrin, cypermethrin, cyphenothrin, deltamethrin, empenthrin, esfenvalerate, etofenprox, fenpropathrin, fenvalerate, flucythrinate, flumethrin, fluvalinate, halfenprox, imiprothrin, kadethrin, permethrin, phenothrin, prallethrin, pyrethrins, resmethrin, silafluofen, tefluthrin, tetramethrin (phthalthrin), tralomethrin, transfluthrin, bistrifluron, flucycloxuron, hexaflumuron, lufenuron, novaluron, noviflumuron, triflumuron, diflubenzuron, teflubenzuron, flufenoxuron, chlorfluazuron, pyriproxyfen, methoprene, hydroprene, kinoprene, fenoxycarb, chromafenozide, halofenozide, methoxyfenozide, tebufenozide, spinetoram, spinosad, sulfoxaflor, flupyradifurone, triflumezopyrim, cyromazine, etoxazole, clofentezine, diflovidazin, hexythiazox, pymetrozine, pyrifluquinazon, diafenthiuron, azocyclotin, tricyclohexyltin hydroxide (cyhexatin), fenbutatin oxide, propargite, tetradifon, chlorfenapyr, DNOC, sulfluramid, pyflubumide, buprofezin, amitraz, hydramethylnon, acequinocyl, fluacrypyrim, bifenazate, fenazaquin, fenpyroximate, pyridaben, pyrimidifen, tebufenpyrad, tolfenpyrad, rotenone (derris), metaflumizone, indoxacarb, spirodiclofen, spiromesifen, spirotetramat, cyenopyrafen, cyflumetofen, chlorantraniliprole, cyantraniliprole, flubendiamide, flonicamid, azadirachtin, benzomate (benzoximate), phenisobromolate (bromopropylate), chinomethionat, dicofol, GS-omega/kappa HXTY-Hvla peptide, pyridalyl, demiditraz, chlordimeform, ethiprole, fluhexafon, emodepside, monepantel, fenbendazole, febantel, pyrantel pamoate, meta-diamide, pyrifluquinazon, chlorantraniliprole, cyantraniliprole, spirotetramat, lepimectin, metaflumizone, pyrafluprole, pyriprole, hydramethylnon, triazamate, flometoquin, afidopyropen, fluralaner, afoxolaner, toltrazuril, sulfadimethoxine, coumatetralyl, flupyrimin, N,N-diethyl-m-toluamide (DEET), organometallic compounds, dinitro compounds, organosulfur compounds, urea-based compounds, triazine-based compounds, hydrazine-based compounds, and acid addition salts of these compounds:

[Chem. 2]

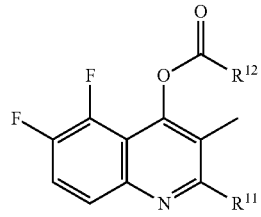

(10)

[in the general formula (10), $R^{11}$ represents an alkyl group having 1 to 4 carbon atoms, and $R^{12}$ represents an alkyl group having 1 to 4 carbon atoms or an alkoxy group having 1 to 4 carbon atoms].

[6]
The Mesostigmata mite control composition according to any one of [1] to [3], wherein
the other pest control agents are at least one selected from the group consisting of a compound represented by the following formula (11), a compound represented by the following formula (12), a compound represented by the following formula (13), carbaryl, bendiocarb, permethrin, flupyrimin, fenobucarb, propoxur, fenitrothion, trichlorfon, phenothrin, deltamethrin, tetramethrin (phthalthrin), abamectin, and acid addition salts of these compounds:

[Chem. 3]

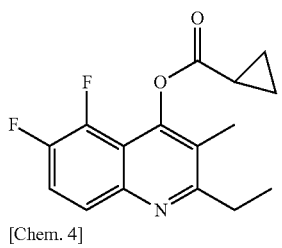

(11)

[Chem. 4]

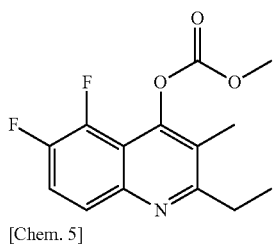

(12)

[Chem. 5]

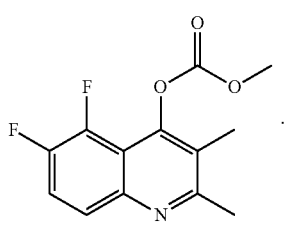

(13)

[7]
The Mesostigmata mite control composition according to any one of [1] to [6], further comprising:
  a carrier acceptable for use in animal drugs Mesostigmata mite control.

[8]
A Mesostigmata mite control composition comprising, as active ingredients:
  at least one selected from the group consisting of compounds represented by the following general formula (10) and acid addition salts thereof; and
  at least one selected from the group consisting of other pest control agents:

[Chem. 6]

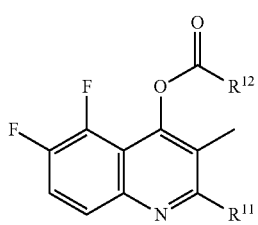

(10)

[in the general formula (10), $R^{11}$ represents an alkyl group having 1 to 4 carbon atoms, and $R^{12}$ represents an alkyl group having 1 to 4 carbon atoms or an alkoxy group having 1 to 4 carbon atoms].

[9]
The Mesostigmata mite control composition according to [8], wherein
the Mesostigmata mite is at least one selected from the group consisting of mites of the family Dermanyssidae and mites of the family Macronyssidae.

[10]
The Mesostigmata mite control composition according to [8] or [9], wherein
the other pest control agents are at least one selected from the group consisting of pesticides, anthelmintics, acaricides, rodenticides, and microbicides.

[11]
The Mesostigmata mite control composition according to [8] or [9], wherein
the compounds represented by the general formula (10) are at least one selected from the group consisting of a compound represented by the following formula (11), a compound represented by the following formula (12), and a compound represented by the following formula (13), and
the other pest control agents are at least one selected from the group consisting of carbaryl, bendiocarb, permethrin, flupyrimin, fenobucarb, propoxur, fenitrothion, trichlorfon, phenothrin, deltamethrin, tetramethrin (phthalthrin), abamectin, and acid addition salts of these compounds:

[Chem. 7]

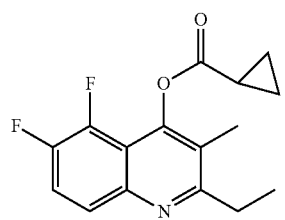

(11)

[Chem. 8]

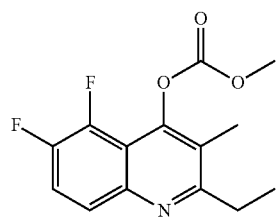

(12)

[Chem. 9]

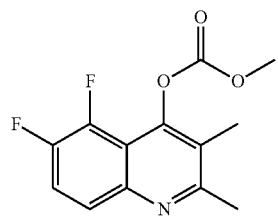

(13)

[12]
A Mesostigmata mite control method using the Mesostigmata mite control composition according to any one of [1] to [11].

[13]
A combination product of:
  at least one selected from the group consisting of compounds represented by the following general formula (1) and acid addition salts thereof; and at least one selected from the group consisting of other pest control agents, for Mesostigmata mite control:

[Chem. 10]

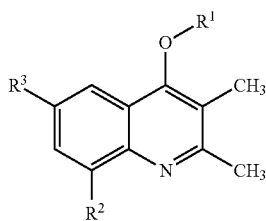

(1)

[in the general formula (1), $R^1$ represents a hydrogen atom, —$COR^4$, —$COOR^4$ (where $R^4$ represents an alkyl group having 1 to 4 carbon atoms), —$CH_2OCH_3$, or —$COCH_2OCH_3$, and $R^2$ and $R^3$ may be the same or different, and each represent a hydrogen atom, a halogen atom, an alkyl group having 1 to 4 carbon atoms, or an alkoxy group having 1 to 4 carbon atoms].

[14]
A Mesostigmata mite control method comprising:
applying an effective amount of the combination product according to [13] to at least one selected from the group consisting of Mesostigmata mites, homeotherms, insects, and habitats of Mesostigmata mites.

Advantageous Effects of Invention

According to the present invention, it is possible to provide a Mesostigmata mite control composition and a combination product for Mesostigmata mite control as well as Mesostigmata mite control methods using these, having an excellent control effect on Mesostigmata mites that do harm to homeotherms and insects by parasitism or blood-sucking.

DESCRIPTION OF EMBODIMENTS

Hereinafter, the present invention will be described in detail according to preferred embodiments of the present invention.

A Mesostigmata mite control composition (hereinafter, sometimes referred to simply as a "control composition") of the present invention comprises, as active ingredients: at least one selected from the group consisting of compounds represented by the following general formula (1) and acid addition salts thereof; and at least one selected from the group consisting of other pest control agents:

[Chem. 11]

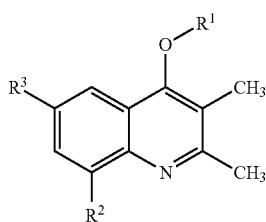

(1)

[in the general formula (1), $R^1$ represents a hydrogen atom, —$COR^4$, —$COOR^4$ (where $R^4$ represents an alkyl group having 1 to 4 carbon atoms), —$CH_2OCH_3$ or —$COCH_2OCH_3$, and $R^2$ and $R^3$ may be the same or different, and each represent a hydrogen atom, a halogen atom, an alkyl group having 1 to 4 carbon atoms, or an alkoxy group having 1 to 4 carbon atoms].

In the compounds represented by the general formula (1), $R^1$ represents a hydrogen atom, —$COR^4$, —$COOR^4$, —$CH_2OCH_3$, or —$COCH_2OCH_3$. Here, $R^4$ represents an alkyl group having 1 to 4 carbon atoms. $R^2$ and $R^3$ may be the same or different, and each represent a hydrogen atom, a halogen atom, an alkyl group having 1 to 4 carbon atoms, or an alkoxy group having 1 to 4 carbon atoms.

Preferably, in the compounds represented by the general formula (1), $R^1$ is —$COR^4$ or —$COOR^4$, and $R^4$ is an alkyl group having 1 to 4 carbon atoms (for example, a methyl group, an ethyl group, a propyl group, a butyl group, or the like), and more preferably a methyl group. In addition, preferably, $R^2$ and $R^3$ each independently represent a halogen atom, a hydrogen atom, or an alkyl group having 1 to 4 carbon atoms, and are each, for example, a fluorine atom, a bromine atom, a chlorine atom, a methyl group, an ethyl group, a propyl group, a butyl group, or the like. These compounds represented by the general formula (1) or acid addition salts thereof can be produced, for example, by the production method described in Japanese Patent No. 4152742 or a method based on the production method.

In the present invention, the "acid addition salts" are preferably acid addition salts acceptable for use in agricultural and veterinary drugs and/or acid addition salts acceptable for use in animal drugs, and include, for example, hydrochloric acid salts, nitric acid salts, phosphoric acid salts, acetic acid salts, and the like.

In the present invention, the compounds represented by the general formula (1) and compounds represented by a general formula (10) described below each independently can take the form of hydrates or solvates, and such hydrates and solvates are also encompassed by these compounds in the present invention.

Some specific examples of the compounds represented by the general formula (1) include compounds described in Table 1 in which $R^1$ is an acetyl group or a methoxycarbonyl group.

TABLE 1

| Name of Compound | Substituents | | |
|---|---|---|---|
| | $R^1$ | $R^2$ | $R^3$ |
| Compound A | $COCH_3$ | F | t-Bu |
| Compound B | $COCH_3$ | $CH_3$ | t-Bu |
| Compound C | $COCH_3$ | $CH_3$ | Br |
| Compound D | $COCH_3$ | $CH_3$ | F |
| Compound E | $COCH_3$ | $CH_3$ | $C_4H_7$ |
| Compound F | $COOCH_3$ | H | F |

The "comprising, as active ingredients" in the control composition of the present invention encompasses, as a matter of course, a case where the control composition contains a pharmaceutically acceptable carrier (carrier acceptable for use in animal drugs Mesostigmata mite control) or the like according to the dosage form, and also means that the control composition may contain an additional agent usable in combination.

In the present invention, the other pest control agent used together with at least one of compounds represented by the general formula (1) and acid addition salts thereof are not particularly limited, but include agents such as pesticides, anthelmintics, acaricides, rodenticides, microbicides, antifungal agents, antiviral agents, and synergists, and may be one of them alone or two or more of them in combination. The other pest control agents are preferably at least one selected from the group consisting of pesticides, anthelmintics, acaricides, rodenticides, and microbicides.

As the other pest control agents used together with at least one of compounds represented by the general formula (1) and acid addition salts thereof, preferable examples of pesticides, anthelmintics, acaricides, rodenticides, and microbicides include compounds represented by the following general formula (10), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate; organophosphorus compounds such as acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos, dicrotophos, dimethoate, dimethylvinphos, ethyl-p-nitrophenyl phenylthiophosphonothiate (EPN), ethion, ethoprophos, famphur, fenamiphos, fenitrothion, fenthion, fosthiazate, heptenophos, imicyafos, isofenphos, isopropyl-O-(methoxyaminothio-phosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimifos, temephos, terbufos, tetrachlorvinphos, thiometon, triazophos, trichlorfon, and vamidothion; carbamate-based compounds such as alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, and fenothiocarb; nereistoxin derivatives such as bensultap, cartap, thiocyclam, and thiosultap-sodium; organochlorine compounds such as dicofol, tetradifon, chlordane, and endosulfan; phenylpyrazole-based compounds such as fipronil and ethiprole; avermectin-based compounds such as avermectin, ivermectin, milbemycin, selamectin, moxidectin, eprinomectin, abamectin, emamectin benzoate, lepimectin, and mylbemectin; neonicotinoid-based compounds such as imidacloprid, clothianidin, thiamethoxam, acetamiprid, nitenpyram, thiacloprid, and dinotefuran; pyrethroid-based compounds such as acrinathrin, allethrin, bifenthrin, bioallethrin, cycloprothrin, cyfluthrin, cyhalothrin, cypermethrin, cyphenothrin, deltamethrin, empenthrin, esfenvalerate, etofenprox, fenpropathrin, fenvalerate, flucythrinate, flumethrin, fluvalinate, halfenprox, imiprothrin, kadethrin, permethrin, phenothrin, prallethrin, pyrethrins, resmethrin, silafluofen, tefluthrin, tetramethrin (phthalthrin), tralomethrin, and transfluthrin; benzoylurea-based compounds such as bistrifluron, flucycloxuron, hexaflumuron, lufenuron, novaluron, novifluuron, triflumuron, diflubenzuron, teflubenzuron, flufenoxuron, and chlorfluazuron; juvenile hormone-like compounds such as pyriproxyfen, methoprene, hydroprene, kinoprene, and fenoxycarb; and molting hormone-like compounds such as chromafenozide, halofenozide, methoxyfenozide, and tebufenozide.

[Chem. 12]

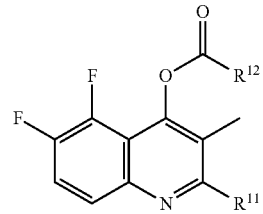

(10)

[in the general formula (10), $R^{11}$ represents an alkyl group having 1 to 4 carbon atoms, and $R^{12}$ represents an alkyl group having 1 to 4 carbon atoms or an alkoxy group having 1 to 4 carbon atoms]. Moreover, other compounds include benzimidazole compounds such as spinetoram, spinosad, sulfoxaflor, flupyradifurone, triflumezopyrim, cyromazine, etoxazole, clofentezine, diflovidazin, hexythiazox, pymetrozine, pyrifluquinazon, diafenthiuron, azocyclotin, tricyclohexyltin hydroxide (cyhexatin), fenbutatin oxide, propargite, tetradifon, chlorfenapyr, DNOC, sulfluramid, pyflubumide, buprofezin, amitraz, hydramethylnon, acequinocyl, fluacrypyrim, bifenazate, fenazaquin, fenpyroximate, pyridaben, pyrimidifen, tebufenpyrad, tolfenpyrad, rotenone (derris), metaflumizone, indoxacarb, spirodiclofen, spiromesifen, spirotetramat, cyenopyrafen, cyflumetofen, chlorantraniliprole, cyantraniliprole, flubendiamide, flonicamid, azadirachtin, benzomate (benzoximate), phenisobromolate (bromopropylate), chinomethionat, dicofol, GS-omega/kappa HXTY-Hv1a peptide, pyridalyl, demiditraz, chlordimeform, ethiprole, fluhexafon, emodepside, monepantel, fenbendazole, and febantel; isoxazoline compounds such as pyrantel pamoate, meta-diamide, pyrifluquinazon, chlorantraniliprole, cyantraniliprole, spirotetramat, lepimectin, metaflumizone, pyrafluprole, pyriprole, hydramethylnon, triazamate, flometoquin, afidopyropen, fluralaner, and afoxolaner; sulfa drugs such as toltrazuril and sulfadimethoxine; coumarin-based compounds such as coumatetralyl; N,N-diethyl-m-toluamide (DEET); organometallic compounds; dinitro compounds; organosulfur compounds; urea-based compounds; triazine-based compounds; hydrazine-based compounds; flupyrimin; and acid addition salts of these compounds (preferably, acid addition salts acceptable for use in animal drugs), and may be one of them alone or two or more of them in combination.

According to a preferable aspect of the present invention, the other pest control agents used together with at least one of compounds represented by the general formula (1) and acid addition salts thereof are selected from the group consisting of a compound represented by the following formula (11), a compound represented by the following formula (12), and a compound represented by the following formula (13), among the compounds represented by the general formula (10); and carbaryl, bendiocarb, permethrin, flupyrimin, fenobucarb, propoxur, fenitrothion, trichlorfon, phenothrin, deltamethrin, tetramethrin (phthalthrin), abamectin, and acid addition salts of these compounds (preferably, acid addition salts acceptable for use in agricultural and veterinary drugs):

[Chem. 13]

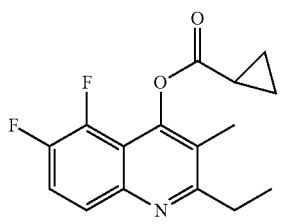
(11)

[Chem. 14]

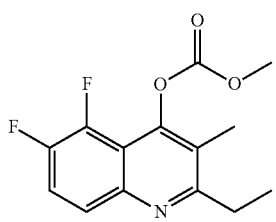
(12)

[Chem. 15]

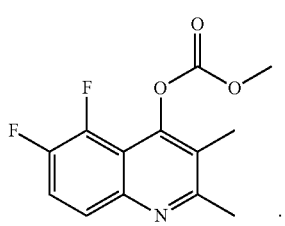
(13)

[Chem. 17]

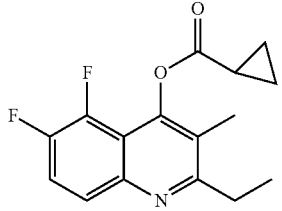
(11)

[Chem. 18]

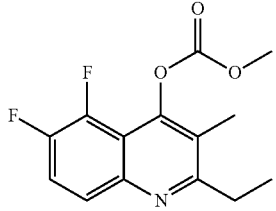
(12)

[Chem. 19]

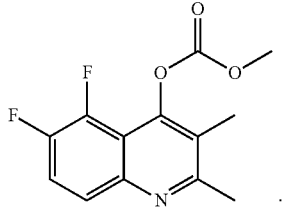
(13)

In addition, the present invention also provides, as a Mesostigmata mite control composition of the present invention, a Mesostigmata mite control composition comprising, as active ingredients: at least one selected from the group consisting of compounds represented by the following general formula (10) and acid addition salts thereof; and at least one selected from the group consisting of other pest control agents:

[Chem. 16]

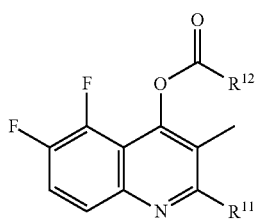
(10)

[in the general formula (10), $R^{11}$ represents an alkyl group having 1 to 4 carbon atoms, and $R^{12}$ represents an alkyl group having 1 to 4 carbon atoms or an alkoxy group having 1 to 4 carbon atoms].

A preferable compound represented by the general formula (10) is at least one selected from the group consisting of a compound represented by the following formula (11), a compound represented by the following formula (12), and a compound represented by the following formula (13):

The other pest control agents used together with at least one of compounds represented by the general formula (10) and acid addition salts thereof are not particularly limited, but include agents such as pesticides, anthelmintics, acaricides, rodenticides, microbicides, antifungal agents, antiviral agents, and synergists, and may be one of them alone or two or more of them in combination. The other pest control agents are preferably at least one selected from the group consisting of pesticides, anthelmintics, acaricides, rodenticides, and microbicides.

As the other pest control agents used together with at least one of compounds represented by the general formula (10) (preferably, the compound represented by the formula (11), (12), or (13)) and acid addition salts thereof, preferable examples of pesticides, anthelmintics, acaricides, rodenticides, and microbicides are selected from the group consisting of carbaryl, bendiocarb, permethrin, flupyrimin, fenobucarb, propoxur, fenitrothion, trichlorfon, phenothrin, deltamethrin, tetramethrin (phthalthrin), abamectin, and acid addition salts of these compounds (preferably, acid addition salts acceptable for use in agricultural and veterinary drugs).

In addition, the present invention also provides a combination product of: at least one selected from the group consisting of compounds represented by the general formula (1) and acid addition salts thereof; and at least one selected from the group consisting of other pest control agents.

Moreover, the present invention also provides a combination product of: at least one selected from the group consisting of compounds represented by the general formula (10) (preferably, the compound represented by the formula (11), (12), or (13)) and acid addition salts thereof; and at least one selected from the group consisting of other pest control agents.

These combination products can be mixed to be used for producing the control composition of the present invention, and each component can be simultaneously or separately applied to application targets described below to be used for controlling Mesostigmata mite. The other pest control agents in these combination products are as given in the above-described Mesostigmata mite control composition of the the present invention, including the preferable aspect.

According to a preferable embodiment of the present invention, the Mesostigmata mite control composition of the present invention further comprises a carrier acceptable for use in animal drugs Mesostigmata mite control. The Mesostigmata mite control composition of the present invention can be prepared and used as a formulation by using a pharmaceutically acceptable carrier such as a solid carrier, a liquid carrier, or a gaseous carrier as the carrier, and as necessary adding a surfactant, an auxiliary agent, an animal food additive, or the like.

The formulation can be prepared in any dosage form such as an oil solution, an emulsifiable concentrate, a wettable powder, a flowable, granules, a dust, an aerosol, a thermally vapor-releasing agent, a smoking agent, a fumigant, poison bait, bait, a suspension, microcapsules, an ULV agent, a liquid used on the skin or in a body cavity such as a spot-on formulation or a pour-on formulation, a shampoo formulation, a sheet formulation, a resin formulation, pellets, tablets, bolus, capsules, an injectable liquid, an oral liquid, an ointment, or a semi-solid preparation such as gel. These can be used in various applicable usages. The formulations can be produced in usual manners by known methods.

The solid carrier used for producing the formulation includes, for example, talc, bentonite, clay, kaolin, diatomaceous earth, vermiculite, white carbon, calcium carbonates, carbonates, hydrogen carbonates, phosphates, aluminum oxide, silica, clay, feed components such as sugar, cellulose, crushed grains, starch, chemical fertilizers, microcrystalline cellulose, and the like.

The liquid carrier includes, for example, alcohols such as methanol, ethanol, n-hexanol, and ethylene glycol; ketones such as acetone and methyl ethyl ketone, ketones such as cyclohexanone; aliphatic hydrocarbons such as n-hexane, kerosene, cyclohexane, and lamp oil; aromatic hydrocarbons such as toluene, xylene, ethylbenzene, and methylnaphthalene; ethers such as diethyl ether, dioxane, and tetrahydrofuran; esters such as ethyl acetate and butyl acetate; nitriles such as acetonitrile and isobutyronitrile; ethers such as diisopropyl ether and dioxane; acid amides such as dimethylformamide and dimethylacetamide; halogenated hydrocarbons such as dichloromethane, trichloroethane, and carbon tetrachloride; vegetable oils such as soybean oil and cottonseed oil; dimethyl sulfoxide; water; and the like.

The gaseous carrier includes, for example, liquefied petroleum gases such as butane gas, LPG (liquefied petroleum gas); air; nitrogen; carbon dioxide gas; isopentane; dimethyl ether; and fluorocarbons.

In addition, the surfactant includes, for example, cationic surfactants such as didecyldimethylammonium chloride, cetyltrimethylammonium chloride, [mono, bis (trimethylammoniummethylene chloride)]-alkyltoluene, benzalkonium chloride, domiphen bromide, and benzethonium chloride; nonionic surfactants such as polyoxyethylated castor oil, polyoxyethylated sorbitan oleate, glyceryl monostearate, polyoxyethyl stearate, and alkylphenol polyglycol ether; amphoteric surfactants such as disodium n-lauryl-β-iminodipropionate, benzalkonium chloride, polyalkylpolyamino-ethylglycine, and lecithin; fluorosurfactant; OPPANOL, sodium dichloroisocyanurate, polyoxyethylene alkylphenol ethers, polyethylene glycol ethers, polyol esters, sugar alcohol derivatives, alkyl aryl ethers and polyoxyethylated products thereof, alkyl sulfates, and alkyl sulfonates.

The auxiliary agent may be a binder, a dispersant, an antioxidant, a preservative, an accidental ingestion prevention agent, a thickener, a foaming agent, a blowing agent, an antifoam, a blowing agent degradation accelerator, an oxidant, an oxidant degradation accelerator, a heat generation controlling agent, a pest-attracting flavor and/or fragrance, a stabilizer, or the like, and includes, for example, synthetic water-soluble polymers such as carboxymethyl cellulose, methyl cellulose, polyacrylate, alginate, gelatin, gum arabic, polyvinylpyrrolidone, polyvinyl alcohol, and methyl vinyl ether, maleic anhydride copolymers, polyethylene glycol, wax, colloidal silica, lignin derivatives, bentonite, saccharides, acidic isopropyl phosphate, BHT (2,6-di-tert-butyl-4-methylphenol), BHA (a mixture of 2-tert-butyl-4-methoxyphenol and 3-tert-butyl-4-methoxyphenol), azodicarbonamide, p,p'-oxybis(benzenesulfonyl hydrazide), N,N'-dinitrosopentamethylenetetramine, azobisisobutyronitrile, dibutylhydroxytoluene, nordihydroguaiaretic acid, dehydroacetic acid, zinc oxide, calcium oxide, powdered capsicum, vegetable oil, mineral oils, fatty acids and fatty acid esters, cheese flavors, and the like.

Any ones of the above-described carriers, surfactants, and auxiliary agents may be used in combination as appropriate.

Examples of the Mesostigmata mite control method of the present invention as well as the methods of using the Mesostigmata mite control composition and the combination product of the present invention include a method of application to an application target, for example, a Mesostigmata mite and/or a habitat of a Mesostigmata mite (including habitable places) by spraying, smoking, or the like; oral administration to an insect and/or homeotherm parasitized by a Mesostigmata mite or an insect and/or homeotherm having a potential of being parasitized; parenteral administration such as injection (intramuscular, subcutaneous, intravenous, intraperitoneal); a method of administration through transdermal administration and nasal administration such as immersing, spraying, bathing, washing, pouring-on and spotting-on, and dusting; a method of administration with a formed product using a strip, a plate, a band, a collar, an ear mark, a limb-band, a label device, or the like; and the like. The administration can be conducted in any dosage form suitable for the administration route of active ingredients in which at least one of compounds represented by the general formula (1) and acid addition salts thereof or at least one of compounds represented by the general formula (10) and acid addition salts thereof is combined with at least one of other pest control agents.

In the Mesostigmata mite control composition and the combination product of the present invention, the mass ratio (A1:B1) of the at least one of compounds represented by the general formula (1) and acid addition salts thereof (A1 component) and the at least one of other pest control agents (B1 component), as well as the mass ratio (A2:B2) of the at least one of compounds represented by the general formula (10) and acid addition salts thereof (A2 component) and the at least one of other pest control agents (B2 component) are each independently, preferably 200:1 to 1:100, more preferably 200:1 to 1:25, and further preferably 5:1 to 1:10.

The amount of the Mesostigmata mite control composition or the combination product of the present invention to be applied to a Mesostigmata mite, an insect or a homeotherm parasitized by a Mesostigmata mite, or a habitat of a Mesostigmata mite or an insect or a homeotherm parasitized by a Mesostigmata mite can be changed as appropriate depending on the environment for use. The amount of active ingredients in the composition or the combination product, that is, the amount of active ingredients in which at least one of compounds represented by the general formula (1) and acid addition salts thereof and at least one of other pest control agents are combined or active ingredients in which at least one of compounds represented by the general formula (10) and acid addition salts thereof and at least one of other pest control agents are combined is generally in the range of 0.01 to 5000 mg/m² in the case of application to a plane, and is generally in the range of 0.1 to 1000 mg/m³ in the case of application to a space.

In the case of administering the Mesostigmata mite control composition or the combination product of the present invention to a homeotherm, the amount of active ingredients in the composition or the combination product to be administered is generally in the range of 0.01 to 2000 mg. In the case of oral administration, the amount of at least one of compounds represented by the general formula (1) and acid addition salts thereof or the amount of at least one of compounds represented by the general formula (10) and acid addition salts thereof is generally in the range of 0.01 to 500 mg/kg of the body weight of the animal.

In the Mesostigmata mite control composition and the combination product of the present invention, the contents of at least one of compounds represented by the general formula (1) and acid addition salts thereof (A1 component), at least one of compounds represented by the general formula (10) and acid addition salts thereof (A2 component), and at least one of other pest control agents (B1 component or B2 component) are not particularly limited and can be each independently adjusted as appropriate depending on the used method, the amount of application, and the amount of administration.

In addition, the control composition of the present invention can be normally used as it is as a Mesostigmata mite control agent or used after being diluted with a solvent such as water.

Mesostigmata mites against which the control composition or the combination product of the present invention exhibits control effects include, for example, mites of the family Dermanyssidae such as red mite (*Dermanyssus gallinae*); mites of the family Macronyssidae such as northern fowl mite (*Ornithonyssus sylviarum*) and tropical fowl mite (*Ornithonyssus bursa*); mites of the family Ascidae such as *Blattisocius keegani* and *Blattisocius dentriticicus*; mites of the family Halarachnidae such as *Dermanyssus hirundinis*, tropical rat mite (*Ornithonyssus bacoti*), *Laelaps echidninus*, canine nasal mite (*Pneumonyssus caninum*), *Laelaps jettmari*, and *Pneumonyssus simicola*; and mites of the family Laelaptidae such as *Varroa* mite (*Varroa destructor*), and preferably is a mite of the family Dermanyssidae such as red mite (*Dermanyssus gallinae*); or a mite of the family Macronyssidae such as northern fowl mite (*Ornithonyssus sylviarum*) or tropical fowl mite (*Ornithonyssus bursa*).

Insects and homeotherms which are parasitized by or whose blood is sucked by Mesostigmata mites against which the control composition or the combination product of the present invention exhibits control effects or insects and homeotherms to which the control composition or the combination product of the present invention is to be applied include mammals such as humans, cattle, horses, pigs, sheep, goats, camels, donkeys, dogs, cats, rabbits, monkeys, guinea pigs, and hamsters; birds such as chickens, domestic ducks, geese, quails, and turkeys; and insects such as honeybees, of which birds are preferred.

EXAMPLES

Hereinafter, Examples of the present invention will be described in detail; however, the present invention is not limited to these Examples.

Representative Formulation Examples of the present invention will be shown below.

Formulation Example 1. Wettable Powder

Compound A of the present invention (compound A described in Table 1, the same applies below) (16%), permethrin (4%), clay (40%), diatomaceous earth (32%), white carbon (2%), sodium lauryl sulfate (1%), and calcium lignosulfonate (5%) were uniformly mixed and crushed to prepare a wettable powder.

Formulation Example 2. Flowable

Compound A of the present invention (16%), permethrin (4%), a naphthalenesulfonic acid formalin condensate (4%), propylene glycol (5%), xanthan gum (0.05%), a silicone antifoam (0.05%), and water (70.9%) were added, uniformly mixed, and crushed to prepare a flowable.

Formulation Example 3. Flowable

Compound A of the present invention (16%), permethrin (4%), a polyoxyethylene tristyrylphenyl ether sulfate salt (2%), propylene glycol (5%), xanthan gum (0.2%), a silicone antifoam (0.5%), tricalcium phosphate (0.5%), and water (71.8%) were added, uniformly mixed, and crushed to prepare a flowable.

Formulation Example 4. Dust

Compound A of the present invention (1.6%), permethrin (0.4%), clay (60%), talc (37%), and calcium stearate (1%) were uniformly mixed to obtain a dust.

Formulation Example 6. Emulsifiable Concentrate

Compound A of the present invention (16%), permethrin (4%), N,N-dimethylformamide (20%), xylene (50%), and polyoxyethylene alkyl aryl ether (10%) were uniformly mixed and dissolved to obtain an emulsifiable concentrate.

Formulation Example 7. Liquid

Compound A of the present invention (4%), permethrin (1%), hexylene glycol (50%), and isopropanol (45%) were uniformly mixed to obtain a liquid for transdermal administration.

Formulation Example 8. Liquid

Compound A of the present invention (1.6%), permethrin (0.4%), dimethyl sulfoxide (10%), 2-propanol (35%), and acetone (53%) were uniformly mixed to obtain a liquid for spraying.

Formulation Example 9. Liquid

Compound A of the present invention (1.6%), permethrin (0.4%), and liquid paraffin (98%) were uniformly mixed to obtain a liquid for (pouring-on) transdermal administration.

Formulation Example 10. Aerosol Formulation

Compound A of the present invention (0.08 g) and permethrin (0.02 g) were mixed with NEO-CHIOZOL F (Chuo Kasei Co., Ltd.; kerosene (normal paraffin) (120 ml) and ethane gas (180 ml) to obtain an aerosol formulation.

Test Examples of the cases where the control compositions (mixed agents) of the present invention were used (Examples) and the cases where the respective components were used alone (single agents) (Comparative Examples) are shown below.

Test Example 1: Control Effect 1 on Red Mites (*Dermanyssus gallinae*)

The tip of a Pasteur pipette was sealed with Parafilm, and a methanol solution of the compound A, or each pesticide (another pesticide) (single agent) described in the left columns of Tables 2, 4, and 6 described below, or a mixture (mixed agent) of the compound A and each pesticide described in the left column of Tables 2, 4, and 6 described below at a predetermined concentration was poured into the pipette through an upper portion thereof. One minute later, the Parafilm at the tip was detached, and the liquid agent was discharged. After the pipette was air dried, absorbent cotton was inserted to an upper end of the pipette, and 20 unfed adult red mites (*Dermanyssus gallinae*) were released into the pipette. After the tip was sealed with Hemato-Seal, the pipette was stored in the dark in an incubator at a temperature of 27 to 28° C. and a humidity of 50 to 60%. After 72 hours had passed since the treatment, the mites were observed under a stereomicroscope to determine whether the mites were dead or alive and whether the mites were affected. Then, the ratio (%) of dead and affected mites was calculated according to the following formula. The results are shown in Tables 2, 4, and 6 below.

The ratio (%) of dead and affected mites={(the number of dead mites+the number of affected mites)/(the number of survived mites+the number of affected mites+the number of dead mites)}×100

In addition, theoretical values of the cases where there was no synergistic effect were calculated according to Colby's formula shown below. The results are shown in Tables 3, 5, and 7 below.

Colby's formula: theoretical value (%)=100−($A \times B$)/100

(A: 100−(the ratio of dead mites in the case where only the compound A was applied); B: 100−(the ratio of dead mites in the case where only another pesticide was applied))
(Method of Determining Synergistic Effect)

It was determined that there was synergistic effect in the case where the ratio of dead and affected mites on red mites in the mixed agent exceeded the theoretical value according to Colby's formula.

As shown in Tables 2 to 7 below, all the mixed agents of the compound A with the other pesticides, that is, carbaryl, bendiocarb, permethrin, fenobucarb, propoxur, fenitrothion, trichlorfon, phenothrin, deltamethrin, tetramethrin, abamectin, and flupyrimin exhibited the ratios of dead and affected mites exceeding the theoretical values, demonstrating that there was synergistic effect.

TABLE 2

Ratios of Dead and Affected Mites of Single Agents and Mixed Agents on Red Mites (%)

| Name of Compound | Treatment Amount (ppm) | Compound A (ppm) — | Compound A (ppm) 200 |
|---|---|---|---|
| — | — | 0 | 51.9 |
| Carbaryl | 50 | 46.6 | 77.7 |
| Bendiocarb | 50 | 30.5 | 76.5 |
| Permethrin | 50 | 49.6 | 82.9 |

TABLE 3

Theoretical Values According to Colby's Formula (%)

| Name of Compound | Treatment Amount (ppm) | Compound A (ppm) — | Compound A (ppm) 200 |
|---|---|---|---|
| — | — | 0 | 51.9 |
| Carbaryl | 50 | 46.6 | 74.4 |
| Bendiocarb | 50 | 30.5 | 66.6 |
| Permethrin | 50 | 49.6 | 75.8 |

TABLE 4

Ratios of Dead and Affected Mites of Single Agents and Mixed Agents on Red Mites (%)

| Name of Compound | Treatment Amount (ppm) | Compound A (ppm) — | Compound A (ppm) 50 |
|---|---|---|---|
| — | — | 0 | 29.2 |
| Fenobucarb | 50 | 43.5 | 97.0 |
| Propoxur | 200 | 77.9 | 90.1 |
| Fenitrothion | 200 | 71.8 | 83.2 |
| Trichlorfon | 200 | 84.7 | 89.7 |
| Phenothrin | 500 | 65.2 | 86.3 |
| Deltamethrin | 50 | 75.8 | 83.8 |
| Tetramethrin | 10 | 39.8 | 84.5 |
| Abamectin | 50 | 69.9 | 79.4 |

TABLE 5

Theoretical Values According to Colby's Formula (%)

| Name of Compound | Treatment Amount (ppm) | Compound A (ppm) — | Compound A (ppm) 50 |
|---|---|---|---|
| — | — | 0 | 29.2 |
| Fenobucarb | 50 | 43.5 | 60.0 |
| Propoxur | 200 | 77.9 | 84.4 |
| Fenitrothion | 200 | 71.8 | 80.0 |
| Trichlorfon | 200 | 84.7 | 89.2 |
| Phenothrin | 500 | 65.2 | 75.3 |
| Deltamethrin | 50 | 75.8 | 82.8 |
| Tetramethrin | 10 | 39.8 | 57.3 |
| Abamectin | 50 | 69.9 | 78.6 |

TABLE 6

Ratios of Dead and Affected Mites of Single Agents and Mixed Agents on Red Mites (%)

| Name of Compound | Treatment Amount (ppm) | Compound A (ppm) | | | |
|---|---|---|---|---|---|
| | | — | 10 | 200 | 1000 |
| Flupyrimin | — | 0 | 26.8 | 46.8 | 95.8 |
| | 50 | 65.3 | — | — | 100.0 |
| | 200 | 58.6 | 77.5 | — | — |
| | 1000 | 83.2 | — | 97.9 | — |
| | 5000 | 75.0 | — | 93.0 | — |

TABLE 7

Theoretical Values According to Colby's Formula (%)

| Name of Compound | Treatment Amount (ppm) | Compound A (ppm) | | | |
|---|---|---|---|---|---|
| | | — | 10 | 200 | 1000 |
| Flupyrimin | — | 0 | 26.8 | 46.8 | 95.8 |
| | 50 | 65.3 | — | — | 98.5 |
| | 200 | 58.6 | 69.7 | — | — |
| | 1000 | 83.2 | — | 91.1 | — |
| | 5000 | 75.0 | — | 86.7 | — |

Test Example 2: Control Effect 2 on Red Mites (*Dermanyssus gallinae*)

The tip of a Pasteur pipette was sealed with Parafilm, and a methanol solution of the compound A, another pesticide (the compound represented by the formula (11), the compound represented by the formula (12), or the compound represented by the formula (13)) (single agent), or a mixture (mixed agent) of the compound A and each other pesticide at a predetermined concentration was poured into the pipette through an upper portion thereof. One minute later, the Parafilm at the tip was detached, and the liquid agent was discharged. After the pipette was air dried, absorbent cotton was inserted to an upper end of the pipette, and 20 unfed adult red mites (*Dermanyssus gallinae*) were released into the pipette. After the tip was sealed with Hemato-Seal, the pipette was stored in the dark in an incubator at a temperature of 27 to 28° C. and a humidity of 50 to 60%. After 3 hours had passed since the treatment, the mites were observed under a stereomicroscope to determine whether the mites were dead or alive and whether the mites were affected. Then, the ratio (%) of dead and affected mites was calculated according to the following formula. The results are shown in Table 8.

The ratio (%) of dead and affected mites={(the number of dead mites+the number of affected mites)/(the number of survived mites+the number of affected mites+the number of dead mites)}×100

In addition, theoretical values of the cases where there was no synergistic effect were calculated according to Colby's formula shown below. The results are shown in Table 9 below.

Colby's formula: theoretical value (%)=100−(A×B)/100

(A: 100−(the ratio of dead mites in the case where only the compound A was applied); B: 100−(the ratio of dead mites in the case where only another pesticide was applied))

(Method of Determining Synergistic Effect)

It was determined that there was synergistic effect in the case where the ratio of dead and affected mites on red mites in the mixed agent exceeded the theoretical value according to Colby's formula.

As shown in Tables 8 to 9 below, all the mixed agents of the compound A with the compound represented by the formula (11), the compound represented by the formula (12), and the compound represented by the formula (13) exhibited the ratios of dead and affected mites exceeding the theoretical values, demonstrating that there was synergistic effect.

TABLE 8

Ratios of Dead and Affected Mites of Single Agents and Mixed Agents on Red Mites (%)

| Name of Compound | Treatment Amount (ppm) | Compound A (ppm) | | | |
|---|---|---|---|---|---|
| | | — | 10 | 200 | 1000 |
| — | — | 0 | 19.9 | 33.5 | 24.9 |
| Formula (11) | 5 | 53.7 | 80.9 | 70.6 | 88.8 |
| | 10 | 53.4 | — | 70.6 | 76.5 |
| | 20 | 62.9 | 72.1 | — | 96.7 |
| Formula (12) | 10 | 50.0 | 75.1 | 83.0 | 87.5 |
| | 20 | 65.5 | 85.9 | 88.9 | 100.0 |
| Formula (13) | 10 | 89.9 | 100.0 | 100.0 | 100.0 |

TABLE 9

Theoretical Values According to Colby's Formula (%)

| Name of Compound | Treatment Amount (ppm) | Compound A (ppm) | | | |
|---|---|---|---|---|---|
| | | — | 10 | 200 | 1000 |
| — | — | 0 | 19.9 | 33.5 | 24.9 |
| Formula (11) | 5 | 53.7 | 63.0 | 69.3 | 65.3 |
| | 10 | 53.4 | — | 69.0 | 65.0 |
| | 20 | 62.9 | 70.3 | — | 72.1 |
| Formula (12) | 10 | 50.0 | 60.0 | 66.8 | 62.5 |
| | 20 | 65.5 | 72.4 | 77.1 | 74.1 |
| Formula (13) | 10 | 89.9 | 91.9 | 93.3 | 100.0 |

Test Example 3: Control Effect 3 on Red Mites (*Dermanyssus gallinae*)

The tip of a Pasteur pipette was sealed with Parafilm, and a methanol solution of the compound represented by the formula (11), the compound represented by the formula (12), or flupyrimin (single agent), or a mixture (mixed agents) of the compound represented by the formula (11) or the compound represented by the formula (12) and flupyrimin at a predetermined concentration was poured into the pipette from an upper portion thereof. One minute later, the Parafilm at the tip was removed, and the liquid agent was discharged. After the pipette was air dried, absorbent cotton was inserted to an upper end of the pipette, and 20 unfed adult red mites (*Dermanyssus gallinae*) were released into the pipette. After the tip was sealed with Hemato-Seal, the pipette was stored in the dark in an incubator at a temperature of 27 to 28° C. and a humidity of 50 to 60%. After 3 hours had passed since the treatment, the mites were observed under a stereomicroscope to determine whether the mites were dead or alive and whether the mites were affected. Then, the ratio (%) of dead and affected mites was calculated according to the following formula. The results are shown in Table 10.

The ratio (%) of dead and affected mites={(the number of dead mites+the number of affected mites)/(the number of survived mites+the number of affected mites+the number of dead mites)}×100

In addition, theoretical values of the cases where there was no synergistic effect were calculated according to Colby's formula shown below. The results are shown in Table 11 below.

Colby's formula: theoretical value (%)=100−(A×B)/100

(A: 100−(the ratio of dead mites in the case where only the compound represented by the formula (11) or the compound represented by the formula (12) was applied); B: 100−(the ratio of dead mites in the case where only flupyrimin was applied))
(Method of Determining Synergistic Effect)

It was determined that there was synergistic effect in the case where the ratio of dead and affected mites on red mites in the mixed agent exceeded the theoretical value according to Colby's formula.

As shown in Tables 10 to 11 below, all the mixed agents of the compound represented by the formula (11) or the compound represented by the formula (12) with flupyrimin exhibited the ratios of dead and affected mites exceeding the theoretical values, demonstrating that there was synergistic effect.

TABLE 10

Ratios of Dead and Affected Mites of Single Agents and Mixed Agents on Red Mites (%)

| Name of Compound | Treatment Amount (ppm) | Flupyrimin (ppm) | | | |
|---|---|---|---|---|---|
| | | — | 50 | 200 | 1000 |
| — | — | 0 | 48.8 | 48.5 | 40.9 |
| Formula (11) | 10 | 53.4 | 100.0 | — | 85.9 |
| | 20 | 62.9 | — | 89.8 | 100.0 |
| Formula (12) | 20 | 65.5 | — | 90.0 | 85.6 |

TABLE 11

Theoretical Values According to Colby's Formula (%)

| Name of Compound | Treatment Amount (ppm) | Flupyrimin (ppm) | | | |
|---|---|---|---|---|---|
| | | — | 50 | 200 | 1000 |
| — | — | 0 | 48.8 | 48.5 | 40.9 |
| Formula (11) | 10 | 53.4 | 76.2 | — | 72.5 |
| | 20 | 62.9 | — | 80.9 | 78.1 |
| Formula (12) | 20 | 65.5 | — | 82.2 | 79.6 |

INDUSTRIAL APPLICABILITY

As described above, according to the present invention, it is possible to provide a Mesostigmata mite control composition and a combination product for Mesostigmata mite control as well as Mesostigmata mite control methods using these, having an excellent control effect on Mesostigmata mites that do harm to homeotherms and insects by parasitism or blood-sucking.

The invention claimed is:

1. A Mesostigmata mite control method comprising:
applying to at least one selected from the group consisting of Mesostigmata mites, homeotherms, insects, and habitats of Mesostigmata mites, a composition comprising as active ingredients:
at least one selected from the group consisting of compounds represented by the following general formula (1) and acid addition salts thereof:

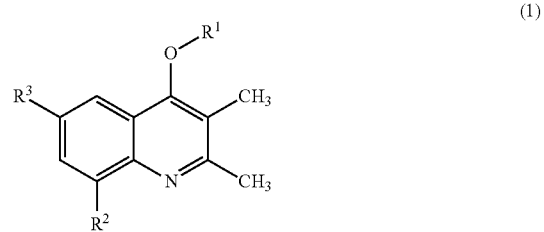

wherein, in the general formula (1), $R^1$ represents —COCH$_3$, $R^2$ represents a fluorine atom, and $R^3$ represents a t-butyl group; and
at least one selected from the group consisting of flupyrimin and acid addition salts thereof,
wherein, in said composition, a mass ratio of the at least one active ingredient selected from the group consisting of compounds represented by the general formula (1) and acid addition salts thereof to the at least one active ingredient selected from the group consisting of flupyrimin and acid addition salts thereof is 1:25 to 20:1.

2. The Mesostigmata mite control method of claim 1, wherein, in said composition, the mass ratio of the at least one active ingredient selected from the group consisting of compounds represented by the general formula (1) and acid addition salts thereof to the at least one active ingredient selected from the group consisting of flupylrimin and acid addition salts thereof is 1:20, 1:5, 1:25 or 20:1.

3. A Mesostigmata mite control method comprising:
applying to at least one selected from the group consisting of Mesostigmata mites, homeotherms, insects, and habitats of Mesostigmata mites, an effective amount of a combination product comprising as active ingredients:
at least one selected from the group consisting of compounds represented by the following general formula (1) and acid addition salts thereof:

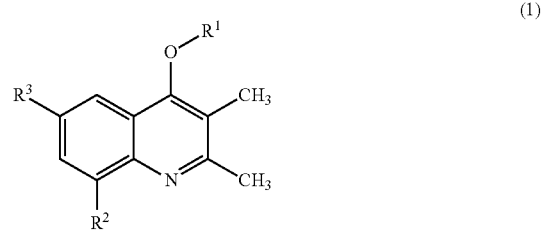

wherein, in the general formula (1), $R^1$ represents —COCH$_3$, $R^2$ represents a fluorine atom, and $R^3$ represents a t-butyl group; and at least one selected from the group consisting of flupyrimin and acid addition salts thereof, wherein, in said combination product, a mass ratio of the at least one active ingredient selected from the group consisting of compounds represented by the general formula (1) and acid addition salts thereof to the at least one active ingredient selected from the group consisting of flupyrimin and acid addition salts thereof is 1:25 to 20:1.

4. The Mesostigmata mite control method of claim 3, wherein, in said combination product, the mass ratio of the at least one active ingredient selected from the group consisting of compounds represented by the general formula (1) and acid addition salts thereof to the at least one active ingredient selected from the group consisting of flupyrimin and acid addition salts thereof is 1:20, 1:5, 1:25 or 20:1.

* * * * *